United States Patent
Rohrmeier et al.

(10) Patent No.: US 8,114,238 B2
(45) Date of Patent: Feb. 14, 2012

(54) METHOD OF PRODUCING A TIGHT JOINT BETWEEN A MULTI-LAYER SYNTHETIC MATERIAL AND A FILTER MEDIUM

(75) Inventors: Josef Rohrmeier, Laberweinting (DE); Matthaeus Huber, Reisbach (DE); Norbert Strassenberger, Adlkofen (DE); Dieter Amesoeder, Bietigheim-Bissingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 371 days.

(21) Appl. No.: 11/060,500

(22) Filed: Feb. 18, 2005

(65) Prior Publication Data
US 2005/0194308 A1  Sep. 8, 2005

(30) Foreign Application Priority Data
Feb. 20, 2004 (DE) .................. 10 2004 008 264

(51) Int. Cl.
*B29C 65/14* (2006.01)
(52) U.S. Cl. ............... 156/272.2; 156/273.5; 156/309.9; 264/297.2; 264/328.1; 264/478; 264/645; 210/488; 210/493.1
(58) Field of Classification Search ............... 156/272.2, 156/273.5, 309, 69, 309.9; 210/488, 493.1; 55/521; 138/96 T; 264/478, 645, 297.2, 264/328.1
See application file for complete search history.

(56) References Cited

U.S. PATENT DOCUMENTS

| | | | | |
|---|---|---|---|---|
| 2,771,156 A | * | 11/1956 | Rohn et al. | 55/498 |
| 3,457,339 A | * | 7/1969 | Pall et al. | 264/162 |
| 3,574,031 A | * | 4/1971 | Heller et al. | 156/272.2 |
| 5,114,508 A | * | 5/1992 | Miyagi et al. | 156/69 |
| 2001/0010297 A1 | * | 8/2001 | Pulek et al. | 210/493.2 |
| 2002/0104793 A1 | * | 8/2002 | Ohtani | 210/321.6 |
| 2006/0023327 A1 | * | 2/2006 | Coombs et al. | 359/883 |

FOREIGN PATENT DOCUMENTS

| | | |
|---|---|---|
| DE | EP0529753 | * 3/1993 |
| DE | 19919289 | 11/2000 |

OTHER PUBLICATIONS

Mahl, machine translation of DE199 19289, 2000.*
ANTEC 1998 Plastics: Plastics on my Mind, vol. 1: Processing, Society of Plastics Engineers, 1998, 2001, pp. 1-3 and title page.*
Meriam Webster definition of laser 1957.*
Abstract for EP0529753 1993.*

* cited by examiner

*Primary Examiner* — Christopher Schatz

(57) ABSTRACT

A method for producing a tight joint between a multi-layer synthetic resin material and a filter medium by selectively melting a layer of the synthetic resin material which has a different thermal absorption capacity in comparison with the other layers by heating the synthetic resin material with infrared radiation, and then fusing the melted synthetic resin layer to the filter medium. A filter element produced by the method of the invention is also disclosed.

6 Claims, 1 Drawing Sheet

METHOD OF PRODUCING A TIGHT JOINT BETWEEN A MULTI-LAYER SYNTHETIC MATERIAL AND A FILTER MEDIUM

BACKGROUND OF THE INVENTION

The present invention relates to a method of producing a tight joint between a thermally fusible multi-layer synthetic resin material and a fluid-permeable filter medium. In addition, the present invention relates to a filter element produced by the method of the invention.

A method of the type defined above is disclosed in German patent publication no. DE 199 19 289. In this method, the layer of the synthetic resin material that is to be heated contains inductively heatable particles which are heated by induction before the joining operation and thus cause the synthetic resin material to melt.

One disadvantage of this method is that an inductive energy source must be made available and properly adjusted. In addition, it is impossible to produce a metal-free filter element by this method because the inductively heatable particles necessarily contain metal.

SUMMARY OF THE INVENTION

It is an object of the present invention to provide an improved method of producing a tight joint between a multi-layer synthetic material and a filter medium.

Another object of the invention is to provide a joint-forming method which permits targeted, selective fusion of the joint areas of a synthetic resin material surface.

A further object of the invention is to provide a joint-forming method which is easy to practice on an industrial scale.

An additional object of the invention is to provide a joint-forming method which avoids metal particles.

A still further object of the invention is to provide a novel filter element which can be produced by the method of the invention.

These and other objects of the invention have been achieved in accordance with the present invention by providing a method for producing a tight joint between a thermally fusible multi-layer synthetic resin material and a fluid-permeable filter medium, comprising selectively melting a layer of the synthetic resin material which has a different thermal absorption capacity in comparison with the other layers without melting the other layers, and fusing the melted layer to the filter medium, wherein the synthetic resin material is heated by infrared radiation.

In accordance with a further aspect of the invention, the objects are achieved by providing a filter element comprising at least one multi-layer synthetic resin end disk which forms a sealing contour and a filter medium arranged in a hollow shape and sealed at at least one end with the at least one multi-layer synthetic resin end disk, wherein the at least one multi-layer synthetic resin end disk is formed by layers having different thermal absorption capacities so that selective heating of one of the layers by infrared radiation is possible.

The method according to the invention for producing a tight joint between a multi-layer synthetic resin material and a filter medium is based on the idea that different surfaces have different heat absorption capacities. For example, these surfaces may be produced in multipart molds by an injection molding process. However, the different surfaces can also be produced by gluing or spraying. The surface to be joined may be, for example, the surface of a synthetic resin end disk of a filter element. The end disk is fused by the thermal action of infrared radiation and then is joined to the end face of the filter medium.

This invention makes use of the physical property by which radiant heat is absorbed differently by different materials and/or surfaces. In this way, a fusion zone of the surface to be joined can be selected. The fusion zone must not form a closed surface and may also constitute only a small portion of the surface. In particular in the case of end disks for filter elements, the fusion zone is usually an annular portion.

For targeted selective fusion of the fusion zone, elements of the synthetic resin end disk can be excluded from fusion, although they are closer than the fusion zone to the heat source. This allows functional parts, which may protrude into the filter element after the fusion process or project laterally beyond the filter medium, to be arranged on the synthetic resin end disk. In comparison with previous infrared fusion methods, it is not necessary to use masks to shield synthetic resin parts otherwise at risk.

The method of the invention additionally makes it possible to use an infrared fusion process not only on flat surfaces but also on curved or angled geometries. Here again, the fusion zone is determined selectively by the configuration of the synthetic resin part, so heating of endangered parts is minimized. Due to the selective heating, less thermal energy needs to be introduced into the synthetic resin part, resulting in accelerated heating. In consequence of the smaller quantity of heat required to be introduced, the cooling process is also accelerated and a shorter cycle times for the fusion process are possible.

The method of the invention makes it advantageously possible to adjust the fusion zone to the end face of a filter medium in a targeted manner. A consequent economic advantage of this approach is the possibility of using infrared lamps as a heat source. The ability to use infrared lamps allows comparatively simple handling and coordination with respect to the surface to be melted.

In accordance with one advantageous embodiment of the invention, the different surfaces have layers with differing pigmentation. This makes use of the physical effect by which dark pigments absorb more radiant energy than lighter colored areas. When applied to an end disk of a filter element, it is thus advisable to use a dark-colored material layer as the fusion zone and to leave the remaining zones as a light or natural-colored layer. For example, the materials to be used for the fusion layer include such products as Zytel 73 G15 BK from DuPont, VE30CW from Leona or Grison BG30S from EMS. The products Zytel 73 00T from DuPont, H3KC from Leona or BKV 25LT from Bayer are suitable for the lighter carrier layer. It is advantageous here that the material properties other than color of the different synthetic resin materials may be identical. In addition, no additives are required in the synthetic resin material. On the contrary, the addition of pigmentation to the synthetic resin layer that is not to be fused may be omitted. Alternatively, pigments may also be used for the various synthetic resin layers that are indistinguishable to the human eye but absorb radiant heat differently. The difference in thermal absorption of colors that are visible externally as the same color makes it possible to produce a uniform color on the visible surfaces.

In another advantageous embodiment of the method of the invention, the synthetic resin surface to be fused is made of materials having different melting points. In addition to the improved thermal absorption, the synthetic resin material in the fusion zone may have a lower melting point. Consequently, the fusion process of the fusion zone is further accelerated. Heat-sensitive contours or elements are advantageously protected from thermal damage due to the shortened duration of the infrared radiation.

Another advantageous embodiment of the invention involves applying fine grooves like those on a phonograph record to the surface of the fusion zone. These grooves improve the heat transfer due to the larger surface area and thus intensify the selective fusion of the fusion zone. The targeted acceleration of the fusion process achieved in this way further contributes to protection of functional parts that are not to be fused and also shortens the cycle time of the fusion process.

A further advantageous embodiment of the invention results from the use of zigzag pleating of the filter medium. Zigzag pleating of the filter medium is known in the state of the art. By using such zigzag pleating, it is possible to accommodate a large filter surface in a relatively small filter volume, so that the required fusion zone which must be sealed by the end disk is reduced to a narrow peripheral ring. This makes it possible to reduce the melting surface in relation to the filter surface area.

In accordance with another embodiment of the invention, the filter element may be designed to be round or it may designed as a so-called coil element with alternately closed channels. Here again there is the advantage that the filter layer can be joined to the synthetic resin end disk in a small peripheral fusion zone.

Yet another advantageous application of the inventive concept is made possible through the choice of a filter medium which has a higher melting point than the classic material used as a filter medium. Through the use of a filter medium with a higher melting point, or even the use of a filter medium which does not melt and therefore has no melting point, damage to the filter medium due to the fusion process is prevented.

A still further advantageous application of the inventive concept is made possible by the fact that the end edges of the filter medium are sealed by the fusion to the synthetic resin material. As a result of the fusion of the end edges of the filter medium into the synthetic resin material of the end disk, additional measures for sealing of the end edges are unnecessary and may be omitted. The joining of the filter medium and the end disk and the sealing of the end of the filter material are thus performed in a single operation.

The filter element according to the invention comprises a filter medium arranged in a ring (i.e., an annular filter medium) covered on both sides or axial end faces by a synthetic resin end disk, with the axial end faces of the annular filter medium being fused in the synthetic resin end disks to form a seal.

The multi-layer synthetic resin end disks are made of synthetic resin materials which have different thermal absorption capacities on their surfaces that are to be fused. This makes it possible for the appropriate surfaces of the synthetic resin end disks to be selectively melted by infrared radiation and then fused to the filter medium.

One advantageous feature of a filter element produced in this way is the possibility of providing functional elements inside the filter element, so it is possible to arrange functional elements, e.g., an interior gasket or a valve, inside the filter element. Functional elements may thus be arranged on the side of the end disks to be melted. Functional elements on the end disks may also protrude beyond the filter medium, so that it is possible, for example, to provide straps, flanges or holders on the laterally protruding end disk.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
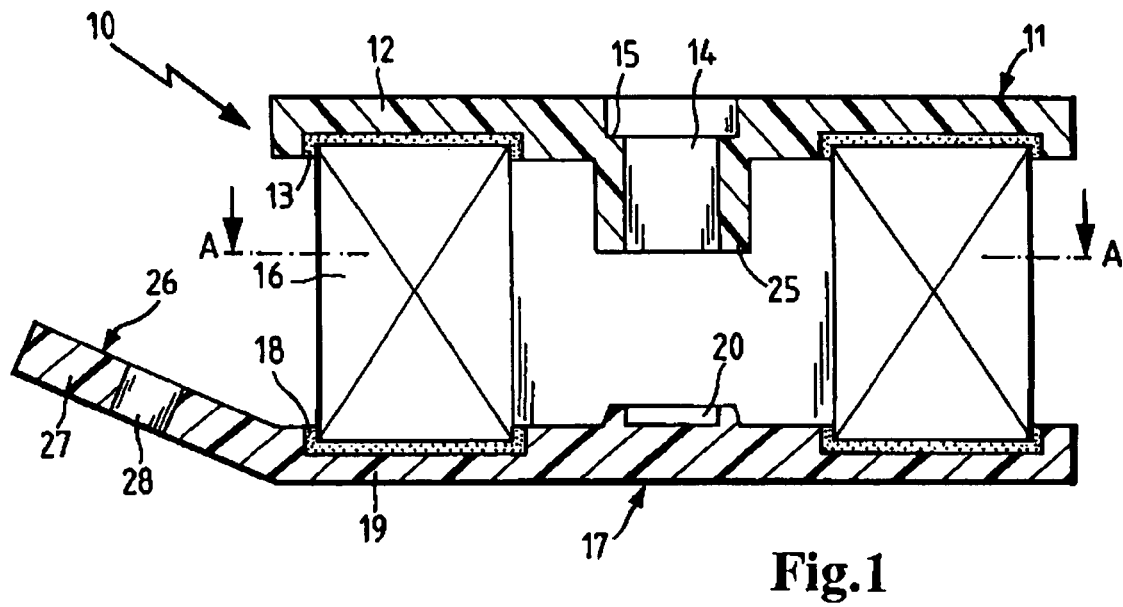
FIG. 1 is a vertical sectional view through a filter element produced in accordance with the present invention.

The filter element 10 depicted in FIG. 1 has a filter medium 16 welded into it between an open end disk 11 and a closed end disk 17. The open end disk 11 is formed from a two-component synthetic resin disk. One component of the open end disk 11 is formed by the upper carrier layer 12, while the second component is formed by the upper fusion layer 13. The upper carrier layer 12 extends over the entire filter medium 16, whereas the upper fusion layer 13 covers only the zone to which the filter medium 16 is welded. The second synthetic resin component which forms the upper fusion layer 13 consists of a material which has a higher heat absorption capacity.

A receiving sleeve 25 is arranged at the center of the open end disk 11, protruding into the inside of the filter medium 16. This receiving sleeve 25 serves to accommodate a connecting pipe (not shown), which is inserted through the functional opening 14 into the filter element 10. The shoulder 15, which is present in the functional opening 14, allows a sealing element (not shown) to be accommodated there, thereby serving to seal the connection.

The closed end disk 17 consists of a lower carrier layer 19 and a lower fusion layer 18. A protruding area 26 of the closed end disk 17 protrudes laterally beyond the filter medium 16. The protruding area 26 is bent toward the filter medium 16 and provided with a bore 28. A strap 27 is formed by the arrangement of the bore 28 in the elongated protruding area 26. In addition, a receiving contour 20 is provided on the closed end disk 17, securing the connecting pipe (not shown) against lateral displacement after introducing the filter element 10.

Figure 2:
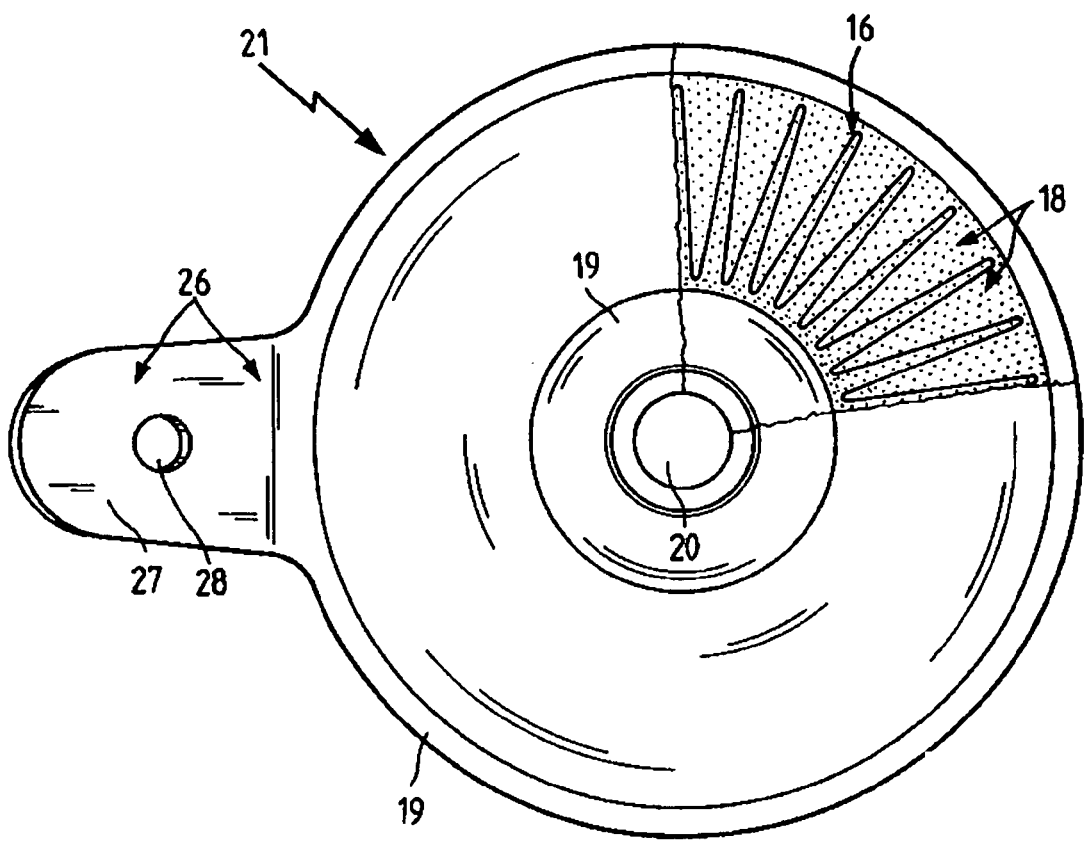
FIG. 2 is a plan view of the filter element of FIG. 1 in partial section along the line A-A.

FIG. 2 shows a plan view of the filter element 10 according to FIG. 1 in a partial sectional view taken along the section line A—A. Parts that correspond to those shown in FIG. 1 are identified by like reference numerals. The individual end disk 21 is formed by a two-component synthetic resin disk, with one component being formed from the lower carrier layer 19 and the second component being formed from the lower fusion layer 18. The receiving contour 20 which is present at the center, serves to receive a connecting pipe (not shown). The lower carrier layer 19 in this variant protrudes beyond the base area of the filter medium 16 welded into it. The zigzag pleated construction of the filter medium 16 and the lower fusion layer 18 are shown only in the sectioned partial area of the drawing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for producing a tight joint between a thermally fusible multi-layer synthetic resin material and a fluid-permeable filter medium, said method comprising:
    pleating a sheet of said filter medium and arranging into an annular ring having two opposing ends;
    forming a unitary multi-layer synthetic resin end disk by injection molding, said multi-layer end disk including a synthetic resin carrier layer and synthetic resin fusion layer arranged on said carrier layer, said fusion layer having a higher thermal absorption capacity than said carrier layer, said fusion layer arranged onto and abutting said carrier layer,
    wherein said end disk is sized to extend over said opposing end of said filter medium,
    said fusion layer sized and positioned to be received against said filter medium ends,
    applying infrared radiation to said and fusion layer of said multi-layer synthetic resin end disk to heat said layer: then
    selectively melting said fusion layer of said end disk from a solid state to a melted state by said infrared radiation without melting said carrier layer of said end disk; then
    contacting said melted fusion layer of said end disk against said filter medium end; then
    cooling and solidifying said melted fusion layer, wherein said solidifying fuses said melted fusion layer onto said filter medium to form said tight joint;
    wherein the fusion layer and carrier layer each contain at least a pigment,
    wherein the pigment in the fusion layer is a different pigment from the pigment in the carrier layer,
    wherein the pigment in the fusion layer is visually indistinguishable from the pigment in the carrier layer,
    wherein the pigment in the fusion layer absorbs heat differently than the pigment in the carrier layer.

2. A method according to claim 1, wherein said fusion layer has grooves to improve heat transfer from said infrared radiation to said fusion layer, said grooves providing a larger surface area to receive said infrared radiation, said grooves operative to intensify selective melting of said fusion layer, said selective melting enabling other portions of said end disk to be excluded from fusion.

3. A method according to claim 1, wherein the filter medium is rolled.

4. A method according to claim 1, wherein the filter medium is nonfusible in that said filter medium can not melt during fusion.

5. A method for producing a tight joint between a thermally fusible multi-layer synthetic resin material and a fluid-permeable filter medium, said method comprising:
    pleating a sheet of said filter medium and arranging into an annular ring having two opposing ends;
    forming a unitary multi-layer synthetic resin end disk by injection molding, said multi-layer end disk including a synthetic resin carrier layer and synthetic resin fusion layer arranged on said carrier layer, said fusion layer having a higher thermal absorption capacity than said carrier layer, said fusion layer arranged onto and abutting said carrier layer,
    wherein said end disk is sized to extend over said opposing end of said filter medium,
    said fusion layer sized and positioned to be received against said filter medium ends,
    applying infrared radiation to said and fusion layer of said multi-layer synthetic resin end disk to heat said layer: then
    selectively melting said fusion layer of said end disk from a solid state to a melted state by said infrared radiation without melting other end disk layers; then
    contacting said melted fusion layer of said end disk against said filter medium end; then
    cooling and solidifying said melted fusion layer, wherein said solidifying fuses said melted fusion layer onto said filter medium to form said tight joint;
    wherein the fusion layer and carrier layer each contain at least a pigment, said pigment in the fusion layer being visually indistinguishable from the pigment in the carrier layer,
    wherein the pigment in the fusion layer is a different pigment from the pigment in the carrier layer,
    wherein the pigment in the fusion layer absorbs heat differently than the pigment in the carrier layer.

6. A method according to claim 5, wherein said fusion layer has grooves to improve heat transfer from said infrared radiation to said fusion layer, said grooves configured to provide a larger surface area to receive said infrared radiation, said grooves operative to intensify selective melting of said fusion layer, said selective melting enabling other portions of said end disk to be excluded from fusion.

* * * * *